F. H. WARD.
ELECTRIC BOX CONNECTION.
APPLICATION FILED NOV. 2, 1910.

1,113,520.

Patented Oct. 13, 1914.

Witnesses:

Frederick H. Ward, Inventor
By his Attorney

UNITED STATES PATENT OFFICE.

FREDERICK H. WARD, OF BROOKLYN, NEW YORK.

ELECTRIC-BOX CONNECTION.

1,113,520. Specification of Letters Patent. Patented Oct. 13, 1914.

Application filed November 2, 1910. Serial No. 590,391.

*To all whom it may concern:*

Be it known that I, FREDERICK H. WARD, a citizen of the United States, residing in the borough of Brooklyn, in the county of Kings and State of New York, have invented certain new and useful Improvements in Electric-Box Connections, of which the following is a specification, reference being had therein to the accompanying drawing.

My invention relates to improvements in electric box connections, and has particular reference to and is illustrated in the accompanying drawings in combination with what is generally known in the trade as outlet boxes.

Figure 1:
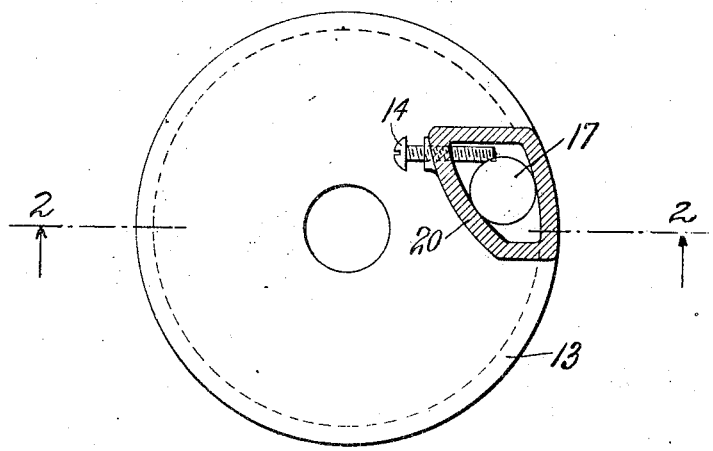
Figure 2:
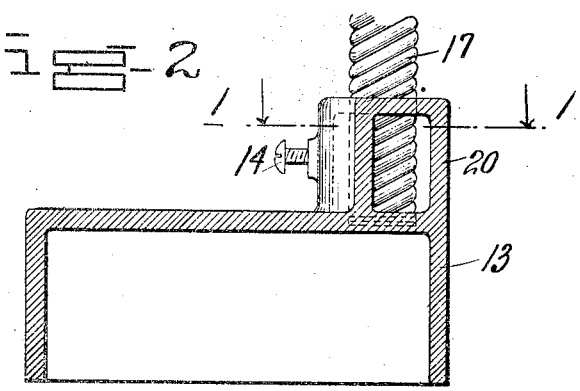

In Figure 1, I have shown in plan view partly in section and on the line 1—1 of Fig. 2, an outlet box with a connector illustrating one application of my invention. Fig. 2 is a side view looking upwardly at Fig. 1, also partly in cross section and on the line 2—2 of Fig. 1.

20 is a suitable connector which may be made integral with or secured to the outlet box 13 providing inlet thereto and is provided with a binder such as the screw 14 which penetrates the connector at one side of the longitudinal center of the bore thereof. The connector 20 is preferably formed integrally with the box and instead of having a cylindrical bore is preferably provided with tapered or curved opposite sides as shown so that spiral armored conduits such as 17 and conduits of different diameters may be introduced thereinto and may be forced between the curved or tapered walls by the binding screw 14 the side of which is forced into frictional engagement with the side of and securely holds said conduit in position.

Of course it will be understood that various modifications may be made without departing from the spirit of the invention as claimed.

I claim:

1. In combination with an electric outlet box, a spiral armored conduit adapted to be secured therein, said box having an inlet for said conduit and a screw to bind said conduit within said inlet, said screw adapted to enter said inlet at one side of its longitudinal center, said inlet larger at one side, said screw adapted to force said conduit to the smaller side of said inlet whereby the side of said screw and the side of said conduit are forced into frictional engagement.

2. In combination with an electric outlet box, a spiral armored conduit adapted to be secured therein, said box having an inlet for said conduit, and a screw to bind said conduit within said inlet, said screw adapted to enter said inlet at one side of its logitudinal center, said inlet having a larger clearance at one side, said screw adapted to force said conduit to the side of said inlet having the smaller clearance whereby said conduit is forced into frictional engagement at several points.

In testimony whereof I affix my signature in presence of two witnesses.

FREDERICK H. WARD.

Witnesses:
 AUG. P. JURGENSEN,
 THOMAS A. HILL.